United States Patent [19]

Pedain et al.

[11] Patent Number: 5,179,187
[45] Date of Patent: * Jan. 12, 1993

[54] USE OF ISOCYANATES CONTAINING URETHANE GROUPS AS DRYING AGENTS AND A PROCESS FOR THE PRODUCTION OF A COATING COMPOSITION

[75] Inventors: Josef Pedain, Cologne; Jürgen Schwindt, Leverkusen; Klaus König, Odenthal; Manfred Schönborn, Leverkusen, all of Fed. Rep. of Germany

[73] Assignee: Bayer Aktiengesellschaft, Fed. Rep. of Germany

[*] Notice: The portion of the term of this patent subsequent to Jan. 14, 2009 has been disclaimed.

[21] Appl. No.: 655,019

[22] Filed: Feb. 14, 1991

[30] Foreign Application Priority Data

Feb. 23, 1990 [DE] Fed. Rep. of Germany ........ 4005763

[51] Int. Cl.⁵ .............................................. C08G 18/10
[52] U.S. Cl. .................................. 528/59; 252/182.22
[58] Field of Search ...................... 528/59; 252/182.22

[56] References Cited

U.S. PATENT DOCUMENTS

| | | | |
|---|---|---|---|
| 3,479,325 | 11/1969 | Blomeyer et al. | 528/69 |
| 3,992,316 | 11/1976 | Pedain et al. | 252/182 |
| 4,292,350 | 9/1981 | Kubitza | 528/67 |
| 4,383,070 | 5/1983 | Markusch et al. | 524/317 |
| 4,442,279 | 4/1984 | Fauss et al. | 528/44 |
| 4,560,494 | 12/1985 | Druetzler | 252/182 |
| 4,857,623 | 8/1989 | Emmerling et al. | 528/28 |
| 5,081,203 | 1/1992 | Pedain et al. | 528/49 |

FOREIGN PATENT DOCUMENTS 1488647 10/1977 United Kingdom .

OTHER PUBLICATIONS

G. Oertel, *Polyurethane Handbook*, 1985, p. 14.

*Primary Examiner*—Maurice J. Welsh
*Assistant Examiner*—Rachel Johnson
*Attorney, Agent, or Firm*—Joseph C. Gil; Thomas W. Roy

[57] ABSTRACT

The present invention relates to a process for the preparation of a coating composition by a) treating moisture-containing auxiliaries and additives at 60° to 120° C. with urethane group-containing isocyanates having (cyclo)aliphatically bound isocyanate groups, an (average) NCO functionality of 0.8 to less than 2.0 and an NCO content of 5 to 17% by weight and b) after completion of the isocyanate/water reaction, combining the mixture obtained in step a) with iscyanate prepolymers having (cyclo)aliphatically bound isocyanate groups.

The present invention also relates to the coating composition obtained by this process and to a composition containing urethane group-containing isocyanates having (cyclo)aliphatically bound isocyanate groups, an (average) NCO functionality of 0.8 to less than 2.0 and an NCO content of 5 to 17% by weight and moisture-containing auxiliaries or additives.

6 Claims, No Drawings

USE OF ISOCYANATES CONTAINING URETHANE GROUPS AS DRYING AGENTS AND A PROCESS FOR THE PRODUCTION OF A COATING COMPOSITION

BACKGROUND OF THE INVENTION

1. Field of the Invention

This invention relates to the use of certain urethane isocyanates containing (cyclo)aliphatically bound isocyanate groups as drying agents for moisture-containing auxiliaries and additives which are used in one-component coating compositions having (cyclo)aliphatic isocyanate prepolymers as binders and to a process for the production of a coating composition based on such NCO prepolymers.

2. Description of the Prior Art

Moisture-curing coating compositions containing organic polyisocyanates, more particularly NCO prepolymers of relatively high molecular weight, as binders have long been known (cf. for example H. Kittel, Lehrbuch der Lacke und Beschichtungen, 1973, Verlag W. A. Colomb, Vol. 1, Part 2, pages 573-576).

After application to a substrate, the coating compositions form films which, by taking up moisture from the atmosphere, crosslink to form ureas. The quality of the paint films and, above all, the stability of the ready-to-use coating composition in storage are critically determined by the use of dry auxiliaries and additives (such as pigments, fillers and/or solvents). Therefore, the additives have to be dried satisfactorily before production of the coating compositions. Highly reactive organic isocyanates have been successfully used as drying agents in this regard (DE-PS No. 1,245,590, DE-OS Nos. 2,539,728 and 3,204,128).

However, the use of highly reactive, low molecular weight isocyanate compounds, in particular tosyl isocyanate, is also attended by disadvantages including high vapor pressure and often extremely high reactivity which necessitates special precautionary measures. Most importantly, the isocyanates react with water to form insoluble secondary products, for example ureas, which crystallize out in paint compositions, which causes haziness and leads to film defects and poor levelling. This applies in particular to coating compositions containing isocyanate prepolymers (NCO prepolymers) having (cyclo)aliphatically bound isocyanate groups as binders because the secondary products formed adversely affect the weathering resistance of the paint films, thus destroying the major advantage of these binders over corresponding aromatic binders.

Accordingly, an object of the present invention is to provide new drying agents which may be used to prepare new coating compositions based on NCO prepolymers having (cyclo)aliphatically bound isocyanate groups which do not require the use of the highly reactive isocyanates mentioned above as drying agents, but which nevertheless possess excellent stability in storage in the absence of moisture and result in high-quality paint films.

This object may be achieved in accordance with the present invention as described in detail hereinafter.

SUMMARY OF THE INVENTION

The present invention relates to a process for the preparation of a coating composition by a) treating moisture-containing auxiliaries and additives at 60° to 120° C. with urethane group-containing isocyanates having (cyclo)aliphatically bound isocyanate groups, an (average) NCO functionality of 0.8 to less than 2.0 and an NCO content of 5 to 17% by weight and b) after completion of the isocyanate/water reaction, combining the mixture obtained in step a) with isocyanate prepolymers having (cyclo)aliphatically bound isocyanate groups.

The present invention also relates to the coating composition obtained by this process and to a composition containing urethane group-containing isocyanates having (cyclo)aliphatically bound isocyanate groups, an (average) NCO functionality of 0.8 to less than 2.0 and an NCO content of 5 to 17% by weight and moisture-containing auxiliaries or additives.

DETAILED DESCRIPTION OF THE INVENTION

In accordance with the present invention the term "(cyclo)aliphatic" means aliphatic and/or cycloaliphatic.

The process according to the invention represents a very considerable advance, even over the systems according to DE-OS No. 2,845,514. According to the teachings of this publication, which is directed to mixtures of mono- and polyisocyanates, water-containing auxiliaries and additives must be treated with suitable drying agents (such as tosyl isocyanate) as demonstrated in Example 3. There is nothing in this publication to indicate that the need for such drying agents could be eliminated.

The drying agents to be used in accordance with the invention are urethane isocyanates or isocyanate mixtures having a content of urethane groups —N-H—CO—O— of about 10 to 40% by weight; a content of (cyclo)aliphatically bound isocyanate groups of 5 to 17% by weight, preferably 9 to 14% by weight; and an (average) NCO functionality of 0.8 to less than 2.0, preferably 0.8 to 1.9 and more preferably 1.0 to 1.8. An average NCO functionality below 2.0 is always achieved if diisocyanates are reacted solely with monohydric and dihydric alcohols under the conditions described in detail hereinafter for the production of the drying agents according to the invention. The preferred isocyanates or isocyanate mixtures for use in accordance with the present invention are essentially compounds corresponding to formulas (A) and (B) or mixtures of these compounds with each other or further with (C) [(C) may not be used alone]:

R—O—CO—NH—X$_1$—NCO  (A)

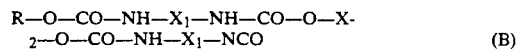

R—O—CO—NH—X$_1$—NH—CO—O—X$_2$—O—CO—NH—X$_1$—NCO  (B)

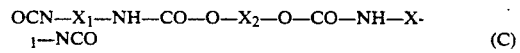

OCN—X$_1$—NH—CO—O—X$_2$—O—CO—NH—X$_1$—NCO  (C)

wherein

R is a (cyclo)aliphatic hydrocarbon radical which has 3 to 18, preferably 6 to 12 carbon atoms and may optionally contain ether oxygen atoms, X$_1$ is a difunctional (cyclo)aliphatic hydrocarbon radical which has 4 to 18, preferably 6 to 13 carbon atoms or a xylylene radical and $X_2$ is a difunctional (cyclo)aliphatic hydrocarbon radical which has 2 to 18, preferably 6 to 14 carbon atoms and may optionally contain ether oxygen atoms.

The isocyanate mixtures preferably used in accordance with the invention are reaction products of low molecular weight, distillable diisocyanates, $X_1(NCO)_2$, with monohydric alcohols ROH and dihydric alcohols $X_2(OH)_2$. However, the isocyanates or isocyanate mixtures to be used in accordance with the invention do not necessarily contain all three types of isocyanates (A) to (C). For example, it is also possible to use reaction products of monohydric alcohols and diisocyanates, i.e., isocyanates corresponding to formula (A) alone, and also mixtures of isocyanates corresponding to formulas (B) and (C), provided that the above-mentioned requirements for the NCO content and NCO functionality are met. Any secondary products present in the isocyanates or isocyanate mixtures from their production (more particularly homologs of relatively high molecular weight or oligourethanes free from NCO groups), which are generally present in a quantity of less than 20 mole percent, do not adversely affect the suitability of the isocyanates or isocyanate mixtures for use in accordance with the invention. The content of monomeric starting diisocyanate is generally below 2% by weight, preferably below 0.5% by weight.

Diisocyanates, $X_1(NCO)_2$, which are suitable for the production of the isocyanates or isocyanate mixtures to be used in accordance with the invention include 1,4-diisocyanatobutane, 1,3-diisocyanatocyclobutane, 1,4-diisocyanatocyclohexane, isophorone diisocyanate, 4,4'-diisocyanatodicyclohexyl methane or 1,6-diisocyanatohexane. The last of these diisocyanates is particularly preferred.

Suitable monohydric alcohols ROH include isopropanol; n- or iso-butanol; cyclohexanol; the various isomers of hexanol, heptanol, octanol, nonanol or decanol; and ether alcohols such as ethyl glycol or butyl glycol. 2-Ethylhexanol is particularly preferred.

Suitable diols $X_2(OH)_2$ include propylene glycol, butane-1,3-diol, hexane-1,6-diol, 1,4-bis-hydroxymethyl cyclohexane, diethylene glycol, dipropylene glycol, tripropylene glycol and, preferably, 2-ethylhexane-1,3-diol.

Mixtures of the starting materials previously set forth may also be used for the production of the isocyanates or isocyanate mixtures to be used in accordance with the invention.

The isocyanates or isocyanate mixtures to be used in accordance with the invention are prepared by known methods, e.g., by reacting excess diisocyanate with the OH components at about 80° to 120° C. and removing excess diisocyanate, preferably by distillation, after reaction of all the hydroxyl groups. The reaction is preferably carried out in steps by initially reacting the diol with excess diisocyanate and then reacting the monoalcohol. In one particularly preferred embodiment, diisocyanate and diol are first reacted, the excess monomeric diisocyanate is then removed, for example by thin-layer distillation, and the reaction product of diol and diisocyanate is subsequently reacted with the monoalcohol. This procedure gives particularly well defined products which are substantially free from secondary products. The NCO functionality of the product, which is so important for advantageous application, may be adjusted particularly effectively in this way.

The NCO functionality of the isocyanates is crucial to their use in accordance with the invention. If drying is carried out with isocyanates which have an NCO functionality of 0.8, crystallizing fractions, clouding and levelling problems may occur from the reaction products which can be formed with water. If the NCO functionality is 2 or higher, relatively high molecular weight reaction products are formed such as polyureas or polybiurets. This in turn results in the formation of highly viscous solutions which are not suitable as one-component binders.

Accordingly, it is critical in accordance with the present invention that the polyisocyanates used for drying have an NCO functionality of not less than 0.8, but less than 2, preferably 0.8 to 1.9 and more preferably 1.0 to 1.8. The NCO functionality is preferably adjusted by the ratio of monoalcohol to diol used.

The coating compositions to be produced by the process according to the invention are coating compositions which contain moisture-curing NCO prepolymers having (cyclo)aliphatically bound isocyanate groups as binders. The products in question are known, i.e., reaction products of (cyclo)aliphatic polyisocyanates with substoichiometric quantities of organic polyhydroxyl compounds, preferably polyester polyols or polyether polyols which are known from polyurethane chemistry. These binders generally have an NCO content of about 3 to 12% by weight and an (average) NCO functionality of about 2.5 to 8. The NCO prepolymers described in U.S. Pat. No. 4,801,675, herein incorporated by reference, are particularly suitable. However, it is also possible to use other prepolymers which satisfy the requirements stated above and which are based on diisocyanates containing (cyclo)aliphatic isocyanate groups, preferably those previously set forth.

The process according to the invention may be carried out as follows by first combining the moisture-containing auxiliaries and additives (such as in particular fillers, pigments, solvents, catalysts, levelling agents and the like) and mixing them with the isocyanate component having urethane groups (drying agent). The resulting mixture is subsequently heated to 60° to 120° C., preferably to 70° to 100° C., with continued thorough mixing. Drying is terminated after about 15 minutes to 2 hours when the evolution of $CO_2$ stops. The dried mixture is then mixed with the polyisocyanate component and, optionally, with other anhydrous components to prepare the stable one-component coating composition.

In practice, the procedure adopted is to calculate the quantity of drying agent corresponding to a molar ratio of isocyanate groups of the drying agent to the total water content of all of the additives and auxiliaries of 2:1 to 30:1, preferably 3:1 to 15:1, and to mix this calculated quantity beforehand with the moisture-containing auxiliaries and additives. By using an excess of the isocyanate component over the water to be removed from the auxiliaries and additives, free isocyanate groups are left over and, together with the one-component binder, react with atmospheric moisture after formation of the coating to form a uniform coating with no defects. In addition, the isocyanate used as drying agent often also acts as a thixotropic agent for the ready-to-use coating composition. Accordingly, it is a drying agent and stabilizer, a rheological additive and also a binder component because it is almost completely incorporated into the resulting coating.

Dry auxiliaries and additives may be added together with the moisture-containing auxiliaries and additives either prior to or after the removal of water in accordance with the present invention. To accelerate the water/NCO reaction during the drying process, it is of advantage to adjust the mixture to a temperature of 60° to 120° C., preferably 70° to 100° C., and to maintain that temperature until the evolution of carbon dioxide is complete. The remaining components are then added, including in particular the one-component PUR resin, which may optionally be used after being dissolved in an anhydrous solvent, and also any remaining auxiliaries and additives which are not added prior to removing water. In general, the ratio by weight of the isocyanate component used for drying in accordance with the process of the invention and the one-component binder is 1:1 to 1:40, preferably 1:2 to 1:10.

In one particular embodiment of the process according to the invention, blocked polyamines (such as polyketimines, polyaldimines and preferably polyoxazolidines) are added as an additive or reactant after completion of drying. The molar ratio of blocked amino groups to NCO groups is 0.01:1 to 1:1. These additives preferentially absorb moisture from the atmosphere and hydrolyze to form polyamines which rapidly react off with the NCO groups of the binder to form urea groups. Rapid drying and the formation of bubble-free coatings are also advantages of this embodiment of the present invention. The advantage of stabilization in accordance with the present invention over the prior art is particularly reflected in these combinations.

If desired, the mixtures prepared as described may have more (anhydrous) solvent poured over them and may then be left to stand for a few hours.

After repeated careful mixing, a ready-to-use, moisture-curing, one-component coating composition is obtained.

The solvents present in the coating compositions are the solvents typically used in coatings technology, such as toluene, xylene, alkyl aromatics, ethyl acetate, butyl acetate, methoxypropyl acetate, methyl ethyl ketone, methyl isobutyl ketone and mixtures thereof. The auxiliaries and additives are the also known and include metallic or mineral pigments, fillers and the additives described, for example, in H. Kittel, Lehrbuch der Lacke und Beschichtungen, Vol. III, Verlag W. A. Colomb, Berlin-Schandorf (2976).

The coating compositions obtained in accordance with the process of the present invention may be processed by any of the methods used in coatings technology. They are suitable for the formation of bubble-free coatings having a high layer thickness on metallic substrates, concrete, masonry and other substrates. They may be used with particular advantage as primers and finishing paints in corrosion prevention, e.g., for coating bridges, containers, solvent containers, steel constructions and electricity pylons; for coatings in the maritime field, e.g., drilling islands, port installations, locks, floating docks and ships.

Because they are synthesized from aliphatic polyisocyanates, the coating compositions according to the invention form high-quality, yellowing-resistant and weather-resistant paint films which are also suitable for decorative applications.

The products obtained in accordance with the present invention have the advantage that they do not form any low molecular weight reaction products which show poor solubility and can adversely affect the resulting coating and also contain no low molecular weight mono- or diisocyanates which could cause problems for the end user.

Compared with previously known one-component polyurethane coating compositions, the end products of the process according to the invention are distinguished by improved stability in storage and at least an equally high drying rate and the resulting coatings possess at least equally good mechanical data.

In the following examples, all parts and percentages are by weight, unless otherwise indicated. The viscosities are determined at 23° C., unless otherwise indicated. The NCO functionality data is calculated from the stoichiometry of the starting materials.

EXAMPLES

General Procedure for the Production of Isocyanates or Isocyanate Mixtures Suitable for Use in Accordance with the Invention The diisocyanate or diisocyanate mixture used as starting material was introduced into a 10 liter vessel and the hydroxyl components were added. The diisocyanate was used in excess, i.e., approximately three isocyanate groups to one hydroxyl group. The reaction mixture was then thoroughly mixed for 1 hour at 60° C. and subsequently heated for 1 hour to 80° C.

Excess diisocyanate was removed from this crude solution by thin-layer or short-path evaporation. The distillation process was carried out slowly under moderate conditions such that the distillation residue was substantially free from monomeric diisocyanate and no reaction product was found in the distillate. The distillation residue was either reacted with other alcohols, more particularly monohydric alcohols (Examples 5 to 9), or was directly used in accordance with the invention.

The products formed were colorless, odorless, viscous liquids or solids.

Examples 1 to 9 describe the production of isocyanates or isocyanate mixtures which were suitable for use in accordance with the invention.

EXAMPLE 1

The starting materials were 4,687 g diisocyanatohexane (HDI), 329 g diethylene glycol and 403 g 2-ethylhexanol. After removal of excess HDI, a colorless product was obtained. This product, which was not flowable at 20° C., had the following properties:
NCO content: 15.1%
average molecular weight: approx. 459

The product contained approximately 39, 4 and 45 mole percent of compounds corresponding to formulas (A), (B) and (C), respectively. It also contained approximately 12 mole percent of other constituents which do not affect the isocyanate mixtures. The average NCO functionality was 1.28.

EXAMPLE 2

4,536 g HDI, 576 g tripropylene glycol and 390 g 2-ethylhexanol were reacted. After removal of excess HDI, a colorless liquid having the following properties was obtained:
viscosity: 630 mPa.s
NCO content: 13.8%
average molecular weight: approx. 521.
Composition in mole percent:
approx. 40 mole percent compound (A)
approx. 4 mole percent compound (B)

approx. 45 mole percent compound (C)
approx. 11 mole percent other constituents
average NCO functionality: 1.28

EXAMPLE 3

Starting products: 3,948 g HDI, 485 g n-dodecanol, 350 g dipropylene glycol. The product obtained after removal of excess HDI was solid and had the following properties:
NCO content: 6.0%
average molecular weight: approx. 520
Composition in mole percent:
38.9 mole percent compound (A)
3.7 mole percent compound (B)
45.4 mole percent compound (C).

The remainder consisted of other constituents. Average NCO functionality: approx. 1.28

EXAMPLE 4

1,512 g HDI and 390 g 2-ethylhexanol were reacted. After removal of 1,200 g excess diisocyanate, a liquid having the following properties was obtained:
viscosity: 105 mPa.s
NCO content: 12.8%
average molecular weight: approx. 310

Almost 100 mole percent of the compound consisted of compound (A).

In Examples 5 to 9, the reaction took place in two stages.

EXAMPLE 5

The starting materials were 1,008 g HDI and 146 g 2-ethylhexane-1,3-diol. They were reacted over a period of 2 hours at 60° to 80° C. until all the hydroxyl groups had reacted, after which approximately 700 g excess HDI was removed. A colorless liquid reaction product was obtained which was reacted with 65 g 2-ethylhexanol. The reaction product was substantially free from compound (A) and consisted almost entirely of compounds (B) and (C) (molar ratio approx. 1:1).
Properties:
NCO value: 10.2%
viscosity: 22,000 mPa.s
NCO functionality: approx. 1.5

The procedure in Examples 6 to 9 corresponded to Example 5.

EXAMPLE 6

The starting products were 1,008 g HDI, 134 g dipropylene glycol and 95 g of a mixture of 2,4,4-trimethylhexanol and 3,5,5-trimethylhexanol (approx. 1:1)
Properties:
NCO content: 8.9%
viscosity: 30,800 mPa.s
NCO functionality: 1.34

The product contained substantial amounts of compounds (B) and (C). The secondary products were present in quantities of less 15 mole percent and did not affect the suitability of the polyisocyanate mixture for use in accordance with the invention.

EXAMPLE 7

The starting materials were 1,008 g HDI, 134 g dipropylene glycol and 104 g 2-ethylhexanol. The clear liquid product had the following properties:
NCO value: 7.8%
viscosity: 25,000 mPa.s
NCO functionality: 1.2

The product consisted almost entirely of compounds (B) and (C)

EXAMPLE 8

The starting materials were 1,008 g HDI, 90 g butane-1,3-diol and 65 g 2-ethylhexanol. The clear colorless product had the following properties:
NCO: 12.7%
viscosity: 10,000 mPa.s
functionality: 1.5.

The product consisted almost entirely of compounds (B) and (C).

EXAMPLE 9

The starting materials were 1,008 g HDI, 90 g butane-1,3-diol and 86 g 2-ethylhexanol. The clear liquid product had the following properties:
NCO content 9.9%
viscosity: 15,000 mPa.s
NCO functionality: 1.34.

The product consisted almost entirely of compounds (B) and (C).

EXAMPLE 10

This example describes the production of a moisture-curing one-component urethane resin containing free NCO groups.

An isocyanurate polyisocyanate based on 1,6-hexane diisocyanate (prepared in accordance with Example 1 of EPA 10 589 which corresponds to U.S. Pat. No. 4,324,879; NCO content 21.4%, viscosity (25° C.) 2,100 mPa.s, monomeric diisocyanate content 0.1% and triisocyanatomonoisocyanurate content approx. 49%) and purified by thin-layer distillation was used as the starting material.

This polyisocyanate was reacted with a hydroxyl polyester prepared from 3.5 parts trimethylol propane, 25.8 parts 1,4-bis-(hydroxymethyl)-cyclohexane, 2.1 parts ethylene glycol, 15.1 parts neopentyl glycol and 49.2 parts phthalic anhydride in accordance with Example 1 of EP-A No. 252,346 (U.S. Pat. No. 4,801,675).

A one-component urethane resin was obtained in the form of a 70% solution in a 4:1 blend of Solvesso 100 solvent (an alkylbenzene mixture) and methoxypropyl acetate. The resin had an NCO content of 9.7% and a viscosity of 1,400 mPa.s/25° C.

EXAMPLE 11

This Example describes the production of a blocked amino compound which may be used as a reactant for the one-component urethane resins. Upon exposure to moisture, two secondary amino groups were formed which reacted with isocyanate groups.

1 mole HDI was reacted at 60° C. with 2 moles of the compound

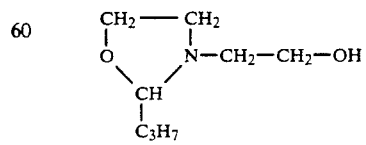

The reaction was over when the NCO content was 0. A viscous colorless liquid (viscosity approx. 8,000 mPa.s) was obtained.

General Method for the Process According to the Invention:

Solvents, pigments, additives and fillers were introduced into a dispersion vessel, followed by the addition of an isocyanate compound from Examples 1 to 9.

The quantity of this isocyanate component was calculated from the water content of the other components. A mixture was prepared using a dissolver disk, initially at a low rotational speed. The material being ground was then dispersed at a peripheral speed of the dissolver disk of 18 m/s. The necessary temperature of approx. 80° to 90° C. was rapidly reached under the effect of the shear forces generated. If not, the mixture was heated. The NCO/water reaction took place sufficiently quickly at 80° C. that the evolution of $CO_2$ was complete after only 30 minutes, indicating that drying was finished.

After cooling of the paste to approximately 30° C., the isocyanate binder and any remaining anhydrous constituents such as catalysts were added with slow stirring.

EXAMPLE 12

This Example described the properties of a moisture-curing one-component polyurethane resin stabilized by the process according to the invention. The resin was produced by the general method.

Composition of the one-component coating composition:

|  | Parts by weight |
| --- | --- |
| Drying agent of Example 4: | 205.9 |
| Soft resin P 65 (polyester of o-phthalic anhydride, maleic acid, hexane-1,6-diol, perhydro-bisphenol A, trimethylol propane and benzoic acid with no reactive terminal groups, used as a pasting resin, a product of Bayer AG) | 102.9 |
| Acronal 700 1 (flow control agent, 10% in ethyl acetate, a product of BASF AG) | 6.9 |
| Disperbyk 163 (dispersion additive, a product of BYK Chemie, Wesel): | 2.7 |
| Bentone 34 (flow aid, 10%, a product of Kronos Titan): | 12.1 |
| Bayertitan R-KB 3 (titanium dioxide pigment): | 328.0 |
| Microtalc A.T. 1 (filler, a product of Norwegian Talc, Bergen) | 58.0 |
| EWO (heavy spar, a product of Sachtleben, Duisburg): | 420.0 |
| Mixture of Solvesso 100 (alkylbenzene solvent mixture) and methoxypropyl acetate (3:1): | 42.0 |

The mixture of these substances was treated in a dissolver as described in the general method. A molar ratio of isocyanate groups of the drying agent to water of approximately 5:1 was used, based on the water content of the additives and auxiliaries.

On completion of drying, the other constituents were added:

|  | |
| --- | --- |
| solvent (as above) | 140.7 |
| additive (of Example 11) | 67.5 |

| -continued | |
| --- | --- |
| one-component resin (of Example 10) | 490.3 |

After thorough mixing, a one-component binder was obtained and stored int he absence of moisture in a container.

When sprayed onto steel plates, the binder provided high gloss paint films of very high quality which were completely dry after a few days at approx. 25° C. and demonstrated good solvent resistance.

To determine whether the binder was sufficiently stable in storage, its viscosity was measured over a prolonged period.

| Storage at room temperature in a closed container for | Viscosity |
| --- | --- |
| 1 day | 550 mPa.s |
| 7 days | 664 mPa.s |
| 14 days | 703 mPa.s |
| 1 month | 720 mPa.s |
| 3 months | 750 mPa.s |
| and then for another 2 days at 60° C. | 1,000 mPa.s |

Result:

The binder demonstrated very high stability storage and was processed without difficulty after storage for several months.

EXAMPLE 13

Comparison

A ready-to-use coating composition was prepared in the same way as in Example 12, except that the 205.9 parts by weight of the polyisocyanate mixture of Example 4 were replaced by 231 parts by weight of a known drying agent

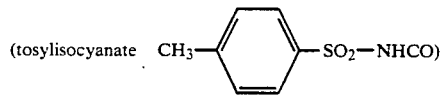

(tosylisocyanate $CH_3$—⟨ ⟩—$SO_2$—NHCO)

Although the coating composition provided very good paint films, it shows unsatisfactory stability in storage:

| Storage at room temperature in a closed container for | Viscosity |
| --- | --- |
| 1 day | 730 mPa.s |
| 7 days | 2,100 mPa.s |
| 14 days | 5,300 mPa.s |
| 1 month | paste |

The comparative test demonstrates that the known drying agent does not provide adequate stability. The test also demonstrates that one-component resins containing a masked amine as a constituent were unsuitable for stabilization with the known drying agent.

EXAMPLE 14

This Example is directed to a comparison of the two binders having the compositions set forth in the following table. The first binder is stabilized in accordance with the invention and the second binder is dried with tosyl isocyanate. In both cases, the molar ratio of water to isocyanate groups of the drying agent during drying was 1:2.2.

| Composition: | Parts by weight | |
|---|---|---|
| | I | II |
| Drying agent of Example 8 | 50.1 | — |
| Tosyl isocyanate | — | 33.4 |
| Flow control agent (Acronal 700 L) | 3.5 | 3.6 |
| Disperbyk 163 (dispersion additive, a product of BYK Wesel) | 1.4 | 1.4 |
| Bentone 34 (flow aid) | 6.0 | 6.0 |
| Methoxypropanol/butyl acetate solvent (3:1) | 77.7 | 63 |
| Titanium dioxide pigment R-KB 3 | 164 | 164 |
| Microtalc A.T. 1 (magnesium silicate, Norwegian Talc, Bergen) | 29 | 29 |
| EWO (heavy spar) (a product of Sachtleben, Duisburg) | 210 | 210 |
| One-component resin of Example 10 | 470.7 | 510.0 |
| Dibutyltin dilaurate catalyst | 3.0 | 3.6 |
| Solvent methoxypropanol/butyl acetate (3:1) | 100.0 | 133.7 |
| Solids content | approx. 70% | approx. 70% |
| Viscosity (mPa.s) at approx. 23° C. after | | |
| 1 day | 418 | 613 |
| 7 days | 602 | 1,440 |
| 14 days | 607 | 1,580 |
| 1 month | 710 | 1,620 |
| 2 months | 700 | 1,700 |
| 3 months | 715 | 1,810 |

This comparison also demonstrates the advantages of the process according to the invention.

EXAMPLE 15

Example 14 was repeated in several parallel tests using the drying agents of Examples 1, 2, 3, 4, 5, 6, 7, and 9. The molar ratio of water to isocyanate groups of the drying agent was varied from 1:2 to 1:8.

One-component systems stable in storage at room temperature were obtained in all the tests. In the most unfavorable case, the viscosity of the ready-to-use coating compositions doubled after storage for 3 months at 23° C. All the coating compositions could still be processed after storage for 3 months at room temperature.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising a urethane group-containing isocyanate having (cyclo)aliphatically bound isocyanate groups, an (average) NCO functionality of 0.8 to less than 2.0 and an NCO content of 5 to 17% by weight and a moisture-containing auxiliary or additive.

2. The composition of claim 1 wherein said urethane-group containing isocyanate is present in an amount which is sufficient to provide a molar ratio of isocyanate groups to water present in said said moisture-containing auxiliary or additive of 2:1 to 30:1.

3. A process for the preparation of a coating composition which comprises
   a) treating a moisture-containing auxiliary or additive at 60° to 120° C. with a urethane group-containing isocyanate having (cyclo)aliphatically bound isocyanate groups, an (average) NCO functionality of 0.8 to less than 2.0 and an NCO content of 5 to 17% by weight and
   b) after completion of the isocyanate/water reaction, combining the mixture obtained in step a) with an isocyanate prepolymer having (cyclo)aliphatically bound isocyanate groups.

4. The process of claim 2 wherein said urethane-group containing isocyanate is present in an amount which is sufficient to provide a molar ratio of isocyanate groups to water present in said said moisture-containing auxiliary or additive of 2:1 to 30:1.

5. A coating composition which is prepared by a process which comprises
   a) treating a moisture-containing auxiliary or additive at 60° to 120° C. with a urethane group-containing isocyanate having (cyclo)aliphatically bound isocyanate groups, an (average) NCO functionality of 0.8 to less than 2.0 and an NCO content of 5 to 17% by weight and
   b) after completion of the isocyanate/water reaction, combining the mixture obtained in step a) with an isocyanate prepolymer having (cyclo)aliphatically bound isocyanate groups.

6. The coating composition of claim 5 wherein said urethane-group containing isocyanate is present in an amount which is sufficient to provide a molar ratio of isocyanate groups to water present in said moisture-containing auxiliary or additive of 2:1 to 30:1.

* * * * *